(12) United States Patent
Davis

(10) Patent No.: US 7,299,764 B1
(45) Date of Patent: Nov. 27, 2007

(54) BOAT HULL

(76) Inventor: Wayne N. Davis, 404 Heather La., Huddleston, VA (US) 24104

( * ) Notice: Subject to any disclaimer, the term of this patent is extended or adjusted under 35 U.S.C. 154(b) by 0 days.

(21) Appl. No.: 11/711,013

(22) Filed: Feb. 27, 2007

Related U.S. Application Data

(60) Provisional application No. 60/798,724, filed on May 9, 2006.

(51) Int. Cl.
*B63B 1/32* (2006.01)
(52) U.S. Cl. .................................................. 114/291
(58) Field of Classification Search ................ 114/291
See application file for complete search history.

(56) References Cited

U.S. PATENT DOCUMENTS

| 3,078,819 | A | 2/1963 | Kiss |
| 3,216,389 | A | 11/1965 | Thorsen |
| D220,661 | S | 5/1971 | Line |
| 4,193,370 | A | 3/1980 | Schoell |
| 4,726,310 | A | 2/1988 | Ard et al. |
| 4,924,797 | A | 5/1990 | Solia |
| 5,211,126 | A | 5/1993 | Johnson |
| 5,570,650 | A | 11/1996 | Harley |
| D384,321 | S | 9/1997 | Anderson |
| 5,934,218 | A | 8/1999 | Chen |
| 6,058,873 | A * | 5/2000 | Koyanagi .................... 114/291 |
| 6,085,677 | A | 7/2000 | Bell |
| 6,546,890 | B1 | 4/2003 | Craig |
| 6,679,192 | B2 | 1/2004 | DeMarco |
| 6,837,176 | B1 * | 1/2005 | Rogerson .................... 114/288 |
| 6,901,873 | B1 | 6/2005 | Lang et al. |
| 2002/0033127 | A1 | 3/2002 | Barrett |
| 2002/0144639 | A1 | 10/2002 | Scarcella |
| 2005/0204981 | A1 | 9/2005 | Little |

FOREIGN PATENT DOCUMENTS

JP         6115482         4/1994

\* cited by examiner

*Primary Examiner*—Stephen Avila
(74) *Attorney, Agent, or Firm*—Richard C. Litman

(57) ABSTRACT

The boat hull includes a hull body having an upper surface and a lower surface. The lower surface of the hull body is divided into a fore portion, a central portion and an aft portion, with a central recess being formed in the central portion and an aft recess being formed in the aft portion. The central recess has a substantially V-shaped cross-sectional contour having a height and a width that both increase in the fore-to-aft direction. The aft recess has a substantially rectangular cross-sectional contour and is in communication with the central recess. The aft recess extends in the fore-to-aft direction from a rear edge of the central recess to an aft edge of the lower surface of the hull body.

12 Claims, 5 Drawing Sheets

BOAT HULL

CROSS-REFERENCE TO RELATED APPLICATION

This application claims the benefit of U.S. Provisional Patent Application Ser. No. 60/798,724, filed May 9, 2006.

BACKGROUND OF THE INVENTION

1. Field of the Invention

The present invention relates to a boat hull having a central recess and an aft, or rear, recess formed in a lower surface thereof, with the central recess being in communication with the aft recess. Particularly, the central recess has a substantially V-shaped cross-sectional contour and the aft recess has a substantially rectangular cross-sectional contour.

2. Description of the Related Art

The stability of a watercraft, such as a motorboat, is dependent upon a wide variety of factors. One of the most important features with regard to the stability of the boat is the contouring of the lower surface of the boat hull. The contouring of the lower surface of the hull, however, may provide stability under a first set of conditions (such as the speed of the boat, the turbulence of the water, etc.) but not under a second set of conditions. For example, when moving at a high rate of speed through water, a hull having a V-shaped projection formed on the lower surface thereof allows for a great degree of stability during angled, high-speed travel, sometimes referred to as "planing". However, at low rates of speed, this V-shaped design provides for very poor lateral stability and, further, is highly susceptible to crosscurrent stress.

In contradistinction, a relatively flat lower surface, such as that often associated with a catamaran, provides great stability at rest or at low speeds. However, it does not offer stability at high speeds. Further, the flat lower surface of a catamaran decreases the available volume within the boat for the occupants' cabin area.

It would be desirable to provide a boat hull having a contoured design that provides the stability of a V-shaped lower surface at high speeds, with the stability at low speeds offered by a flat lower surface, such as that found in catamarans. Thus, a boat hull solving the aforementioned problems is desired.

SUMMARY OF THE INVENTION

The boat hull includes a hull body having an upper surface and a lower surface. The lower surface of the hull body is divided into a fore, or front, portion, a central portion and an aft portion, with a central recess being formed in the central portion and an aft recess being formed in the aft portion. The central recess has a substantially V-shaped cross-sectional contour having a height and a width that both increase in the fore-to-aft direction. The central recess extends between a forward, or fore, vertex and a rear edge. A central vertex of the central recess is positioned along a central axis of the hull body.

The aft recess has a substantially rectangular cross-sectional contour and is in communication with the central recess. The aft recess extends in the fore-to-aft direction from a rear edge of the central recess to an aft edge of the lower surface of the hull body. The aft recess is similar in design to a conventional catamaran hull recess, providing a boat utilizing the boat hull with the rough water performance and cabin space typically associated with a V-shaped hull in combination with the performance and speed typically associated with a catamaran.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
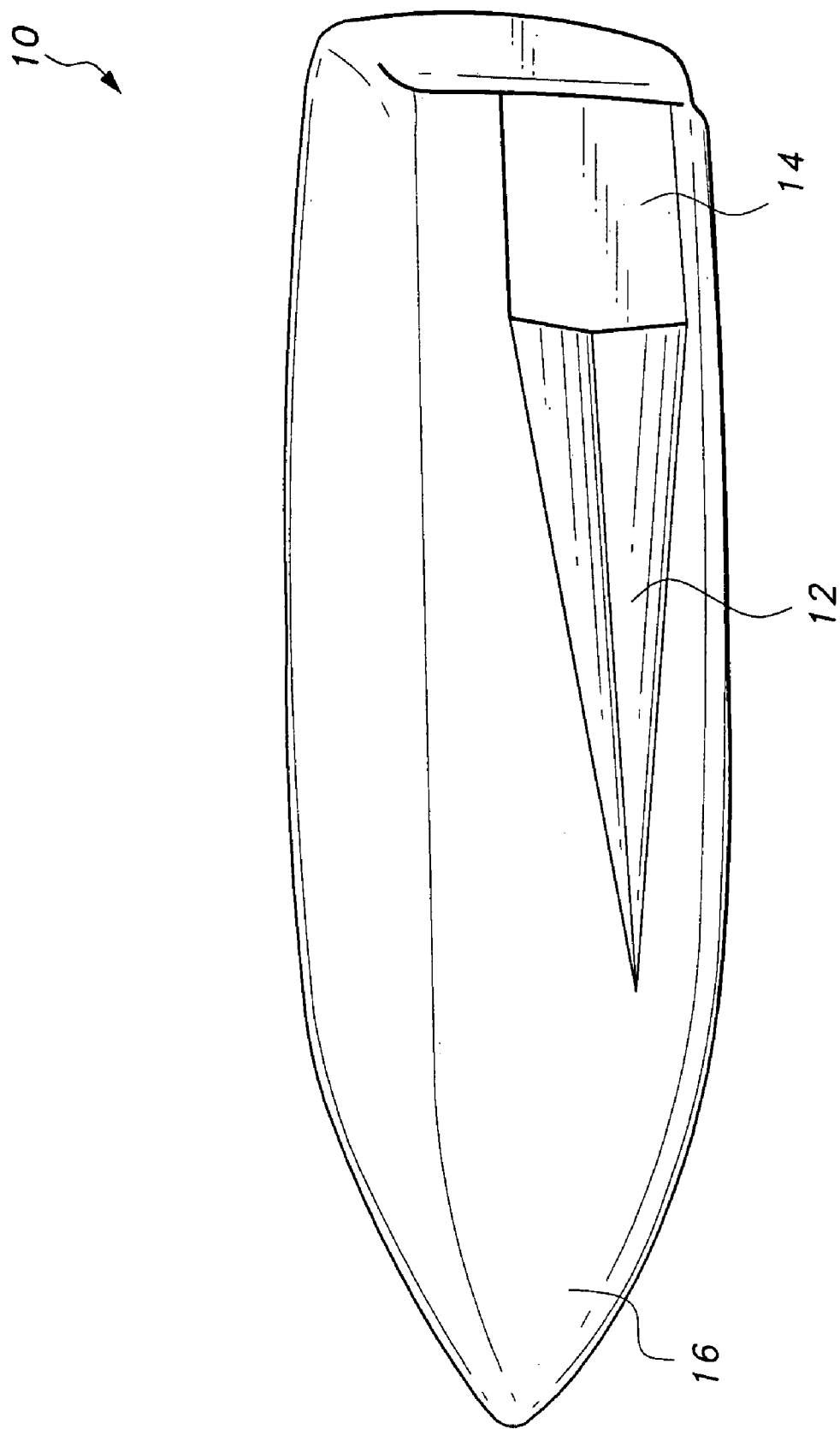
FIG. 1 is a bottom perspective view of a boat hull according to the present invention.

The present invention is directed towards a boat hull 10. As illustrated in FIG. 1 of the drawings, boat hull 10 includes a lower surface 16 having a central recess 12 formed in a central portion thereof. Central recess 12 has an inverted, substantially V-shaped cross-sectional contour, as shown. Further, an aft recess 14, having a substantially rectangular cross-sectional contour, is formed in a rear, or aft, portion of the lower surface 16 and is in communication with central recess 12. The V-shaped central recess 12 provides for stability and maneuverability when a boat utilizing hull 10 is traveling at a relatively high rate of speed, with the fore portion of the hull 10 being angled with respect to the plane of the water, in what is commonly referred to as "planing". The rectangular aft recess 14 provides for lateral stability when the boat is traveling at a low rate of speed, or is at rest, in a manner similar to that commonly associated with a catamaran.

Although illustrated in FIGS. 1-5 as being used in combination with an exemplary conventional single-engine motorboat, it should be understood that boat hull 10 may be utilized with any suitable boat or watercraft. The exemplary boat hull 10 illustrated in FIGS. 1-5 is adapted for use with a boat having a length of approximately twenty-five feet, and having a stern of approximately eight feet in length. This is, however, for exemplary purposes only and these figures will be used below for providing relative exemplary dimensions of the recesses 12, 14. Further, the outboard motor configuration illustrated in FIGS. 1-5 is for exemplary purposes only.

Figure 2:
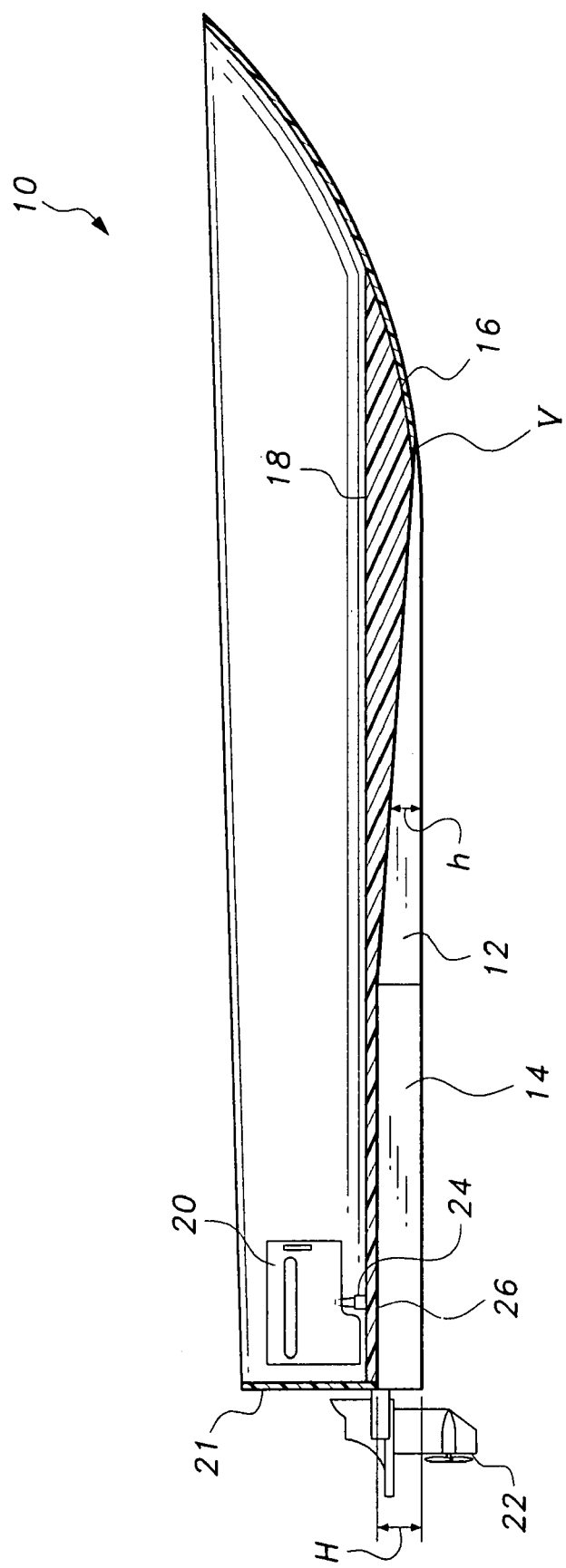
FIG. 2 is a side view in partial section of the boat hull according to the present invention.
Figure 3:
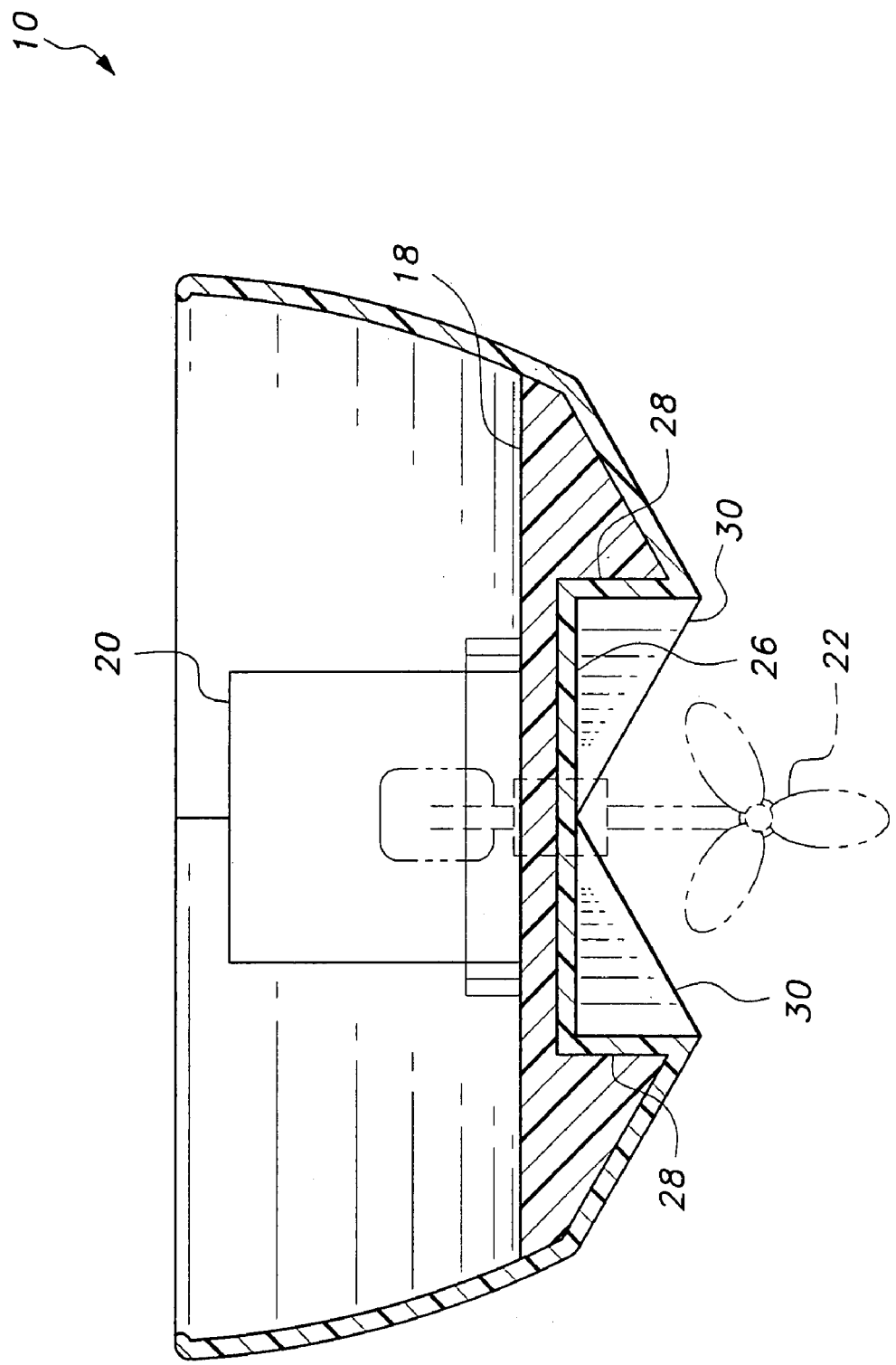
FIG. 3 is a rear view in section of the boat hull according to the present invention.
Figure 4:
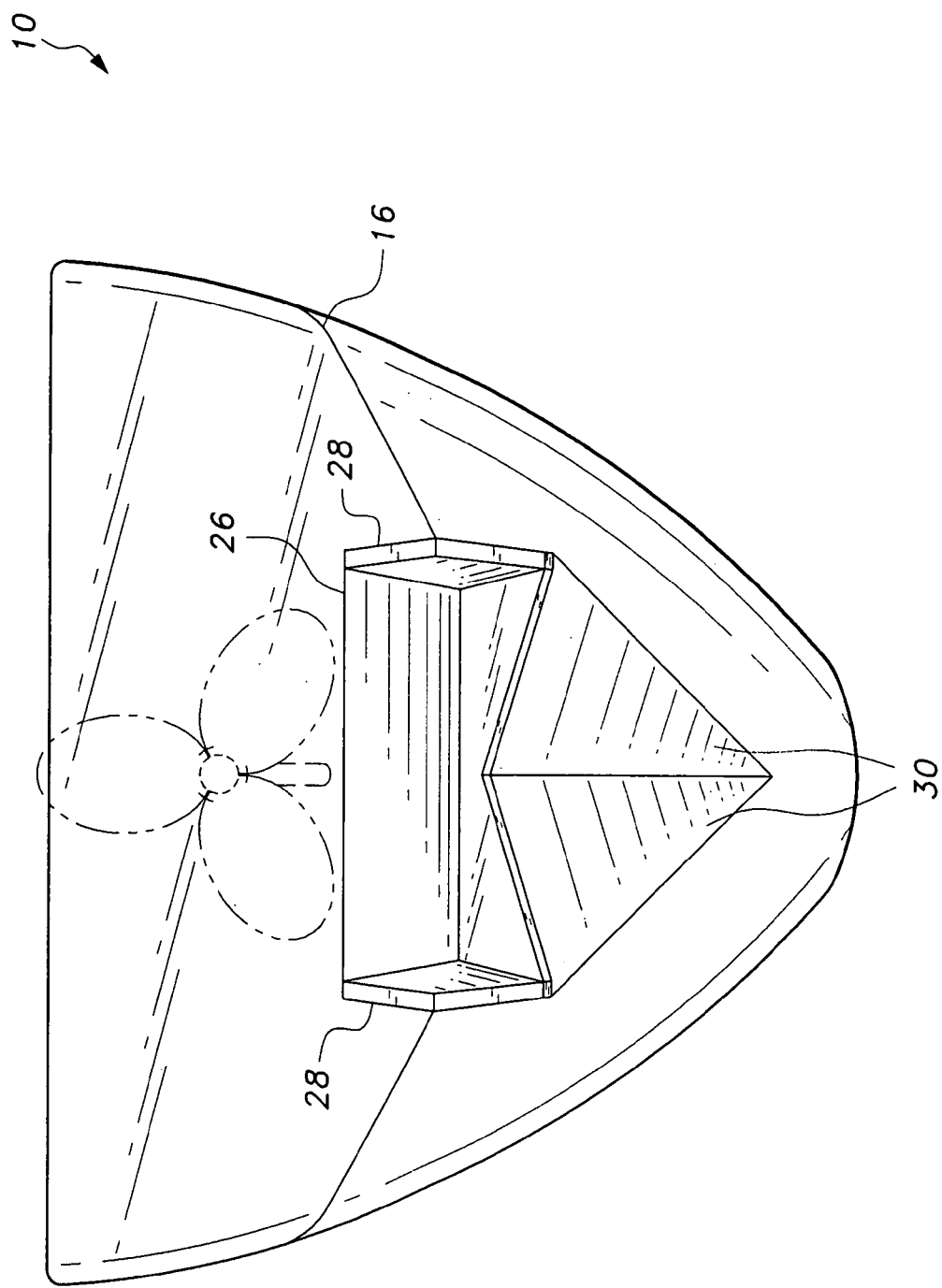
FIG. 4 is a rear perspective view of the boat hull according to the present invention.

As shown in FIG. 2, the boat hull 10 may have a conventional contour when viewed from the side, with the central recess 12 and the aft recess 14 being formed in the lower surface 16, as described above. A floor 18 may be received within the boat hull 10, as shown, for supporting a cabin or the like. A motor mount 24 may be mounted on the rear portion of floor 18 for supporting a motor 20. As noted above, although shown as a single-engine motorboat, the boat hull 10 may be used in combination with any suitable boat configuration, such as a dual-motor driven boat. A rudder and propeller assembly, in communication with motor 20, is mounted to the rear surface 21 of boat hull 10.

Figure 5:
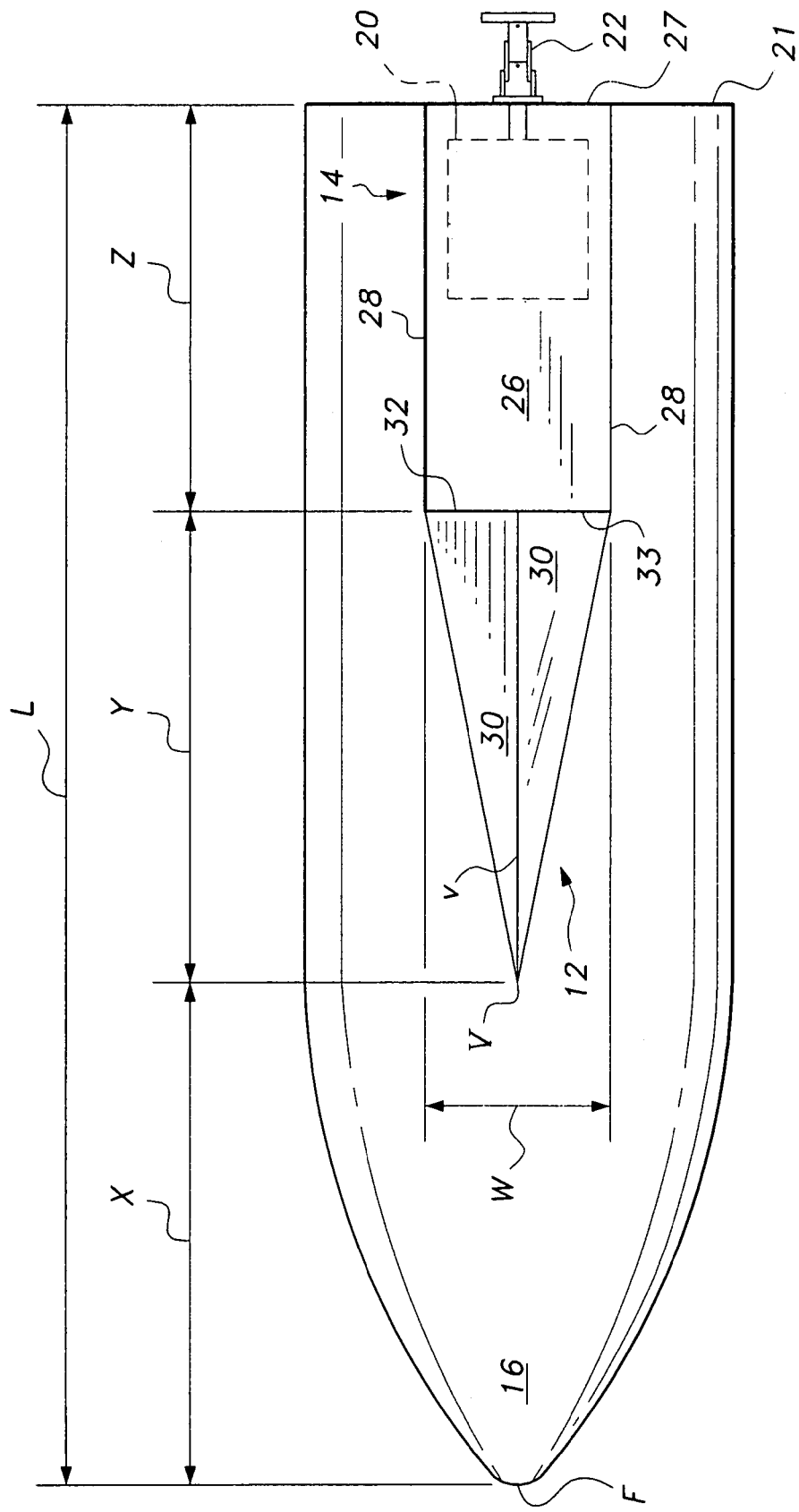
FIG. 5 is a bottom view of the boat hull according to the present invention.

In the bottom view of FIG. 5, the length of boat hull 10, measured along a fore-to-aft central axis, is given by L. The fore vertex of the V-shaped central recess 12 is denoted as V and is positioned a distance X from the fore, or front, edge of hull 10, F. The fore portion of lower surface 16, extending from F to V, is relatively smooth and continuous. In the preferred embodiment, X is approximately ⅓ of L.

Central recess 12 extends rearwardly along the central fore-to-aft axis for a distance Y, which is also approximately equal to ⅓ of L, in the preferred embodiment. Central recess 12 increases in both depth and width in the fore-to-aft direction, as will be described in further detail below. Central recess 12 is in communication with aft recess 14, and central recess 12 terminates at an aft edge 33. The aft recess 14 is defined by a fore wall 32, a pair of sidewalls 28, an upper wall 26 and an open rear end 27. Aft edge 33 of central recess 12 is adjacent and contiguous to the fore wall 32 of aft recess 14 (also shown in FIGS. 3 and 4).

Both the aft edge 33 and the fore wall 32 have a width W, and the aft recess 14 has a length, measured in the fore-to-aft direction, of Z, which in the preferred embodiment is equal to approximately ⅓ of L. Central recess 12 is defined by a pair of angled walls 30, which meet along a central vertex v. The central vertex v extends from fore vertex V to the aft edge 33. When viewed from the bottom, as in FIG. 5, the central recess 12 has a substantially triangular cross-sectional contour, and the aft recess 14 has a substantially rectangular cross-sectional contour. When viewed from the rear, as in FIGS. 3 and 4, the central recess 12 has an inverted, substantially V-shaped cross-sectional contour, and the aft recess 14 has a substantially rectangular cross-sectional contour.

As shown in FIGS. 1 and 2, the central vertex v has an increasing depth or height h, in the fore-to-aft direction. The central vertex v reaches its maximal height at aft edge 33, which is represented by H. H is also the height of rear rectangular recess 14. In the preferred embodiment, the width W of the rear recess 14 (and the maximal width of the central recess 12) is approximately 40% of the width of the rear portion, or stern, of the boat hull 10. Further, in the preferred embodiment, the height H is approximately 25% of the transom depth of the boat hull 10. For the exemplary boat hull having a length L equal to twenty-five feet, with a stern width of eight feet, the width of the rear recess W is approximately three feet and two inches. The length Z of the rear recess 14 is approximately seven feet. The length of the central recess Y is approximately eight feet, and the height H is approximately nine inches for a transom that is three feet deep. As noted above, these dimensions are given for exemplary purposes only.

It should be understood that the contour, proportions, and dimensions of the recesses 12, 14 and of the boat hull 10 are dependent upon the needs and desires of the user. The V-shaped central recess 12 provides a stable and maneuverable surface for a relatively high-speed boat, particularly when planing. The catamaran-like rectangular aft recess 14 provides for lateral stability when the boat is traveling at low speeds or is at rest, thus providing a boat hull 10 that may be safely and stably used in a wide variety of water environments and at varying speeds.

It is to be understood that the present invention is not limited to the embodiment described above, but encompasses any and all embodiments within the scope of the following claims.

I claim:

1. A boat hull, comprising:

a hull body having an upper surface and a lower surface, the lower surface having a fore portion, a central portion and an aft portion, the central portion having a central recess formed therein, the central recess having a substantially V-shaped cross-sectional contour, the central recess having a height and a width, the height and the width of the central recess both increasing in a fore-to-aft direction, the central recess having a forward vertex and a rear edge, the aft portion having an aft recess formed therein, the aft recess having a substantially rectangular cross-sectional contour, the aft recess being in communication with the central recess and extending in the fore-to-aft direction from the rear edge of the central recess to an aft edge of the lower surface, wherein the aft edge of the lower surface of the hull body defines an aft edge width, the aft edge width being measured in a port-to-starboard direction orthogonal to the fore-to-aft direction, the aft recess having a constant aft recess width associated therewith, the aft recess width being approximately 40% of the aft edge width.

2. The boat hull as recited in claim 1, wherein said hull body has a central axis extending in the fore-to-aft direction, the central recess having a central vertex positioned on the central axis, a height associated with said central vertex increasing in the fore-to-aft direction.

3. The boat hull as recited in claim 1, wherein the lower surface of the hull body has a hull length associated therewith, the hull length being measured in the fore-to-aft direction, the central recess having a central length being associated therewith, the central length being approximately ⅓ of the hull length.

4. The boat hull as recited in claim 3, wherein the aft recess has an aft length associated therewith, the aft length being approximately ⅓ of the hull length.

5. The boat hull as recited in claim 1, wherein the aft portion has an aft height measured in a direction orthogonal to the fore-to-aft direction and the port-to-starboard direction, the aft recess having a constant aft recess height, the aft recess height being approximately 25% of the aft height.

6. A boat hull, comprising:

a hull body having an upper surface and a lower surface, the lower surface having a fore portion, a central portion and an aft portion, the central portion having a central recess formed therein, the central recess having a substantially V-shaped cross-sectional contour, the central recess having a height and a width, the height and the width of the central recess both increasing in a fore-to-aft direction, the central recess having a forward vertex and a rear edge, the aft portion having an aft recess formed therein, the aft recess having a substantially rectangular cross-sectional contour, the aft recess being in communication with the central recess and extending in the fore-to-aft direction from the rear edge of the central recess to an aft edge of the lower surface, wherein the lower surface of the hull body has a hull length associated therewith, the hull length being measured in the fore-to-aft direction, the central recess having a central length being associated therewith, the central length being approximately ⅓ of the hull length, the aft recess having an aft length associated therewith, the aft length being approximately ⅓ of the hull length.

7. A boat hull, comprising:

a hull body having an upper surface and a lower surface, the lower surface having a fore portion, a central portion and an aft portion, the central portion having a central recess formed therein, the fore portion having a substantially smooth and continuous convex surface, the central recess having a substantially V-shaped cross-sectional contour, the central recess having a height and a width, the height and the width of the central recess both increasing in a fore-to-aft direction, the central recess having a forward vertex and a rear edge, the aft portion having an aft recess formed therein, the aft recess having a substantially rectangular cross-sectional contour, the aft recess being in communication with the central recess and extending in the fore-to-aft direction from the rear edge of the central recess to an aft edge of the lower surface.

8. The boat hull as recited in claim 7, wherein said hull body has a central axis extending in the fore-to-aft direction, the central recess having a central vertex positioned on the central axis, a height associated with said central vertex increasing in the fore-to-aft direction.

9. The boat hull as recited in claim 7, wherein the lower surface of the hull body has a hull length associated therewith, the hull length being measured in the fore-to-aft direction, the central recess having a central length being associated therewith, the central length being approximately ⅓ of the hull length.

10. The boat hull as recited in claim 9, wherein the aft recess has an aft length associated therewith, the aft length being approximately ⅓ of the hull length.

11. The boat hull as recited in claim 7, wherein the aft edge of the lower surface of the hull body defines an aft edge width, the aft edge width being measured in a port-to-starboard direction orthogonal to the fore-to-aft direction, the aft recess having a constant aft recess width associated therewith, the aft recess width being approximately 40% of the aft edge width.

12. The boat hull as recited in claim 11, wherein the aft portion has an aft height measured in a direction orthogonal to the fore-to-aft direction and the port-to-starboard direction, the aft recess having a constant aft recess height, the aft recess height being approximately 25% of the aft height.

* * * * *